(12) United States Patent
Reid

(10) Patent No.: US 10,823,326 B2
(45) Date of Patent: Nov. 3, 2020

(54) ENHANCED VACUUM-INSULATED ARTICLES WITH CONTROLLED MICROPOROUS INSULATION

(71) Applicant: CONCEPT GROUP LLC, Wellesley, MA (US)

(72) Inventor: Aarne H. Reid, Jupiter, FL (US)

(73) Assignee: Concept Group LLC, Wellesley, MA (US)

( * ) Notice: Subject to any disclaimer, the term of this patent is extended or adjusted under 35 U.S.C. 154(b) by 0 days.

(21) Appl. No.: 16/461,153

(22) PCT Filed: Nov. 14, 2017

(86) PCT No.: PCT/US2017/061558
§ 371 (c)(1),
(2) Date: May 15, 2019

(87) PCT Pub. No.: WO2018/093781
PCT Pub. Date: May 24, 2018

(65) Prior Publication Data
US 2019/0338883 A1    Nov. 7, 2019

Related U.S. Application Data

(60) Provisional application No. 62/422,196, filed on Nov. 15, 2016.

(51) Int. Cl.
*F16L 59/065* (2006.01)
*B32B 1/02* (2006.01)
(Continued)

(52) U.S. Cl.
CPC ............ *F16L 59/065* (2013.01); *A47J 41/022* (2013.01); *B32B 1/02* (2013.01); *B32B 1/08* (2013.01);
(Continued)

(58) Field of Classification Search
CPC ...... F17C 2203/0391; F17C 2205/0355; F25B 9/02; Y10T 29/49826; Y10T 29/49968;
(Continued)

(56) References Cited

U.S. PATENT DOCUMENTS 1,362,805 A   12/1920   Kruse
1,457,504 A    6/1923   Cullen et al.
(Continued)

FOREIGN PATENT DOCUMENTS

CN   202001825 U    10/2011
DE   10019420 A1   10/2001
(Continued)

OTHER PUBLICATIONS https://en.wikipedia.org/wiki/Sodium-sulfur_battery_Jun. 11, 2018, 5 pages.
(Continued)

*Primary Examiner* — Yan Lan
(74) *Attorney, Agent, or Firm* — BakerHostetler

(57) ABSTRACT

An article includes walls defining an insulating space therebetween and a vent forming an exit for gas molecules during evacuation of the space. A distance separating the walls is variable in a portion adjacent the vent such that gas molecules are directed towards the vent imparting a greater probability of molecule egress than ingress such that deeper vacuum is developed without requiring getter material. The variable-distance portion may be formed by converging walls. Alternatively, a portion of one of the walls may be formed such that a normal line at any location within that portion is directed substantially towards a vent opening in the other wall.

15 Claims, 10 Drawing Sheets

(51) Int. Cl.
   *B32B 1/08*   (2006.01)
   *B32B 3/28*   (2006.01)
   *A47J 41/02*  (2006.01)
   *F16L 59/07*  (2006.01)

(52) U.S. Cl.
   CPC .............. *B32B 3/28* (2013.01); *F16L 59/07* (2013.01); *B32B 2255/00* (2013.01); *B32B 2262/105* (2013.01); *B32B 2264/102* (2013.01); *B32B 2307/304* (2013.01); *B32B 2307/724* (2013.01); *B32B 2439/00* (2013.01)

(58) Field of Classification Search
   CPC . Y10T 29/4998; Y10T 29/49993; B32B 1/02; B32B 1/08; B32B 2255/00; B32B 2264/102; B32B 2307/304; B32B 2439/00; B32B 3/28; B32B 2262/105; B32B 2307/724; F16L 59/065; F16L 59/07; F16L 59/06; A47J 41/022; A47J 41/0038
   See application file for complete search history.

(56) References Cited

U.S. PATENT DOCUMENTS

| | | |
|---|---|---|
| 2,085,737 A | 7/1937 | Joseph Cereghino |
| 2,225,660 A | 12/1940 | Rogers |
| 2,362,893 A | 11/1944 | Durst |
| 2,363,893 A | 11/1944 | Monier |
| 2,573,594 A | 10/1951 | Nofzinger |
| 2,666,979 A | 1/1954 | Van Dusen |
| 2,722,336 A | 11/1955 | Aaron et al. |
| 2,807,074 A | 9/1957 | Schroeder |
| 2,867,242 A | 1/1959 | Harris et al. |
| 3,119,238 A | 1/1964 | Chamberlain et al. |
| 3,146,005 A | 8/1964 | Peyton |
| 3,195,564 A | 7/1965 | Carney et al. |
| 3,265,236 A | 8/1966 | Norman et al. |
| 3,460,512 A | 8/1969 | Keichler et al. |
| 3,510,323 A | 5/1970 | Wismer et al. |
| 3,706,208 A | 12/1972 | Kadi et al. |
| 3,736,936 A | 6/1973 | Basiulis et al. |
| 3,760,142 A | 9/1973 | Schoenthaler |
| 4,055,268 A | 10/1977 | Barthel |
| 4,117,201 A | 9/1978 | Keifert |
| 4,157,779 A | 6/1979 | Arashi et al. |
| 4,200,199 A | 4/1980 | Perkins et al. |
| 4,332,401 A | 6/1982 | Stephenson et al. |
| 4,396,211 A | 8/1983 | McStravick et al. |
| 4,399,919 A | 8/1983 | Posnansky et al. |
| 4,450,872 A | 5/1984 | Orcutt |
| 4,491,347 A | 1/1985 | Gustafson |
| 4,515,397 A | 5/1985 | Nowobilski et al. |
| 4,653,469 A | 3/1987 | Miyaji et al. |
| 4,696,104 A | 9/1987 | Vanzetti et al. |
| 4,746,054 A | 5/1988 | Moats et al. |
| 4,758,222 A | 7/1988 | McCoy |
| 4,838,859 A | 6/1989 | Strassmann |
| 4,903,631 A | 2/1990 | Morris |
| 4,919,299 A | 4/1990 | Haines |
| 4,997,124 A | 3/1991 | Kitabatake et al. |
| 5,038,706 A | 8/1991 | Morris |
| 5,052,816 A | 10/1991 | Nakamura et al. |
| 5,108,390 A | 4/1992 | Potocky et al. |
| 5,206,705 A | 4/1993 | Tokura |
| 5,235,817 A | 8/1993 | Gallagher et al. |
| 5,285,559 A | 2/1994 | Thompson et al. |
| 5,411,897 A | 5/1995 | Harvey et al. |
| 5,520,682 A | 5/1996 | Baust et al. |
| 5,524,630 A | 6/1996 | Crowley |
| 5,573,140 A | 11/1996 | Satomi et al. |
| 5,573,532 A | 11/1996 | Chang et al. |
| 5,600,752 A | 2/1997 | Lopatinsky |
| 5,650,020 A | 7/1997 | Ohta et al. |
| 5,674,218 A | 10/1997 | Rubinsky et al. |
| 5,742,048 A | 4/1998 | Kobayashi et al. |
| 5,862,973 A | 1/1999 | Wasserman |
| 5,869,801 A | 2/1999 | Paton et al. |
| 5,870,823 A | 2/1999 | Bezama et al. |
| 6,050,443 A | 4/2000 | Tung |
| 6,095,405 A | 8/2000 | Kim et al. |
| 6,109,518 A | 8/2000 | Mueller et al. |
| 6,139,571 A | 10/2000 | Fuller et al. |
| 6,145,547 A | 11/2000 | Villatte |
| 6,166,907 A | 12/2000 | Chien |
| 6,186,390 B1 | 2/2001 | Tadauchi et al. |
| 6,216,745 B1 | 4/2001 | Augustynowicz et al. |
| 6,360,935 B1 | 3/2002 | Flake |
| 6,706,037 B2 | 3/2004 | Zvuloni et al. |
| 6,755,823 B2 | 6/2004 | Lalonde |
| 6,875,209 B2 | 4/2005 | Zvuloni et al. |
| 6,936,045 B2 | 8/2005 | Yu et al. |
| 7,064,429 B2 | 6/2006 | Bemmerl et al. |
| 7,139,172 B2 | 11/2006 | Bezama et al. |
| 7,150,743 B2 | 12/2006 | Zvuloni et al. |
| 7,203,064 B2 | 4/2007 | Mongia et al. |
| 7,207,985 B2 | 4/2007 | Duong et al. |
| 7,258,161 B2 | 8/2007 | Cosley et al. |
| 7,298,623 B1 | 11/2007 | Kuczynski et al. |
| RE40,049 E | 2/2008 | Li |
| 7,334,630 B2 | 2/2008 | Goodson et al. |
| 7,354,434 B2 | 4/2008 | Zvuloni et al. |
| 7,356,434 B2 | 4/2008 | Wu et al. |
| 7,361,187 B2 | 4/2008 | Duong et al. |
| 7,374,063 B2 | 5/2008 | Reid |
| 7,393,350 B2 | 7/2008 | Maurice |
| 7,419,085 B2 | 9/2008 | Fukunaka et al. |
| 7,451,785 B2 | 11/2008 | Taira et al. |
| 7,460,369 B1 | 12/2008 | Blish, II |
| 7,485,117 B2 | 2/2009 | Damasco et al. |
| 7,497,365 B2 | 3/2009 | Kimura et al. |
| 7,510,534 B2 | 3/2009 | Burdorff et al. |
| 7,515,415 B2 | 4/2009 | Monfarad et al. |
| 7,608,071 B2 | 10/2009 | Duong et al. |
| 7,621,889 B2 | 11/2009 | Duong et al. |
| 7,621,890 B2 | 11/2009 | Duong et al. |
| 7,681,299 B2 | 3/2010 | Reid |
| 7,909,227 B2 | 3/2011 | Duong et al. |
| 7,980,171 B2 | 7/2011 | Groll |
| 8,231,613 B2 | 7/2012 | Baxter et al. |
| 8,353,332 B2 | 1/2013 | Reid |
| 8,434,665 B2 | 5/2013 | Motomura et al. |
| 9,243,726 B2 | 1/2016 | Reid |
| 9,463,918 B2 | 10/2016 | Reid |
| 9,874,303 B2 | 1/2018 | Reid |
| 2001/0030225 A1 | 10/2001 | Nagata |
| 2002/0114937 A1 | 8/2002 | Albert et al. |
| 2003/0079554 A1 | 5/2003 | Van Cleve |
| 2003/0146224 A1 | 8/2003 | Fujii et al. |
| 2004/0116851 A1 | 6/2004 | Johansen et al. |
| 2004/0129756 A1 | 7/2004 | Zakel et al. |
| 2004/0181136 A1 | 9/2004 | McDaniel et al. |
| 2004/0226979 A1 | 11/2004 | Sato et al. |
| 2005/0211711 A1* | 9/2005 | Reid ............... F25B 9/02 220/560.04 |
| 2006/0054234 A1 | 3/2006 | White |
| 2006/0054243 A1 | 3/2006 | Walton |
| 2006/0061092 A1 | 3/2006 | Keyes |
| 2006/0071052 A1 | 4/2006 | Conlon et al. |
| 2006/0076389 A1 | 4/2006 | Kemper et al. |
| 2006/0086773 A1 | 4/2006 | Sanftleben et al. |
| 2006/0282039 A1 | 12/2006 | Duong et al. |
| 2007/0102477 A1 | 5/2007 | Prince |
| 2007/0102478 A1 | 5/2007 | Prince |
| 2007/0235497 A1 | 10/2007 | Hsu |
| 2007/0235498 A1 | 10/2007 | Hsu |
| 2007/0235499 A1 | 10/2007 | Hsu |
| 2007/0246510 A1 | 10/2007 | Hsu |
| 2008/0006598 A1 | 1/2008 | Fujii et al. |
| 2008/0036076 A1 | 2/2008 | Ouyang |
| 2008/0061111 A1 | 3/2008 | Kiriyama |
| 2008/0083816 A1 | 4/2008 | Leinbach et al. |
| 2008/0121642 A1 | 5/2008 | Reid |

(56) References Cited

U.S. PATENT DOCUMENTS

| | | |
|---|---|---|
| 2008/0147055 A1 | 6/2008 | Duong et al. |
| 2008/0169037 A1 | 7/2008 | Ziegler |
| 2008/0197170 A1 | 8/2008 | Prince |
| 2008/0285230 A1 | 11/2008 | Bojan et al. |
| 2009/0031659 A1 | 2/2009 | Kalfon |
| 2009/0065499 A1 | 3/2009 | England |
| 2009/0068070 A1 | 3/2009 | Hashimoto et al. |
| 2009/0123221 A1 | 5/2009 | Marshall |
| 2009/0152331 A1 | 6/2009 | Schmitt et al. |
| 2010/0057064 A1 | 3/2010 | Baust et al. |
| 2010/0057067 A1 | 3/2010 | Baust et al. |
| 2010/0076421 A1 | 3/2010 | Baust et al. |
| 2010/0096037 A1 | 4/2010 | Lee et al. |
| 2010/0258290 A1 | 10/2010 | Bass |
| 2011/0056582 A1 | 3/2011 | Walle et al. |
| 2011/0178514 A1 | 7/2011 | Levin et al. |
| 2011/0264084 A1 | 10/2011 | Reid |
| 2012/0085070 A1 | 4/2012 | Chou et al. |
| 2012/0090817 A1 | 4/2012 | Reid |
| 2012/0175007 A1 | 7/2012 | Pan et al. |
| 2012/0184901 A1 | 7/2012 | Nguyen et al. |
| 2012/0228364 A1 | 9/2012 | Vegelahn |
| 2012/0282792 A1 | 11/2012 | Schloegl |
| 2012/0318808 A1 | 12/2012 | McCormick |
| 2013/0105496 A1* | 5/2013 | Jung ............... F25D 23/062 220/592.05 |
| 2013/0199757 A1 | 8/2013 | Meyer et al. |
| 2014/0008417 A1 | 1/2014 | Visser et al. |
| 2014/0012243 A1 | 1/2014 | Burnett et al. |
| 2014/0090737 A1 | 4/2014 | Reid |
| 2014/0177146 A1 | 6/2014 | Barizza et al. |
| 2014/0182608 A1 | 7/2014 | Egoyants et al. |
| 2014/0275767 A1 | 9/2014 | Baust |
| 2015/0110548 A1 | 4/2015 | Reid |
| 2015/0149800 A1 | 5/2015 | Gendler et al. |
| 2015/0151893 A1 | 6/2015 | Wengreen et al. |
| 2015/0159800 A1 | 6/2015 | Kimura et al. |
| 2015/0168050 A1 | 6/2015 | Cur et al. |
| 2015/0260332 A1 | 9/2015 | Reid |
| 2015/0271927 A1 | 9/2015 | Cocklin et al. |
| 2015/0345930 A1 | 12/2015 | Ikeda et al. |
| 2015/0356730 A1 | 12/2015 | Grove et al. |
| 2016/0044963 A1 | 2/2016 | Saleem |
| 2016/0084425 A1 | 3/2016 | Reid |
| 2016/0279725 A1 | 9/2016 | Azdasht |
| 2016/0314220 A1 | 10/2016 | Sachdev et al. |
| 2016/0317220 A1 | 11/2016 | Guo |
| 2016/0341360 A1 | 11/2016 | Uraguchi et al. |
| 2016/0354853 A1 | 12/2016 | Azdasht |
| 2016/0368072 A1 | 12/2016 | Senga et al. |
| 2017/0043938 A1 | 2/2017 | Reid |
| 2017/0062774 A1 | 3/2017 | Reid et al. |
| 2017/0106414 A1 | 4/2017 | Hamilton |
| 2017/0120362 A1 | 5/2017 | Reid et al. |
| 2017/0165773 A1 | 6/2017 | Azdasht et al. |
| 2017/0225276 A1 | 8/2017 | Reid |
| 2017/0253416 A1 | 9/2017 | Reid |
| 2017/0305641 A1 | 10/2017 | Bodum |
| 2017/0358079 A1 | 12/2017 | Gillies et al. |
| 2018/0106414 A1 | 4/2018 | Reid |
| 2018/0106529 A1 | 4/2018 | Cur et al. |

FOREIGN PATENT DOCUMENTS

| | | | |
|---|---|---|---|
| EP | 0611614 A1 | | 8/1994 |
| EP | 1294022 A2 | | 3/2003 |
| FR | 2550313 | * | 2/1985 |
| GB | 2105226 A | | 3/1983 |
| JP | 06-142909 A | | 5/1994 |
| JP | 3654249 B2 | | 6/2005 |
| JP | 2005-224832 A | | 8/2005 |
| JP | 3962782 B1 | | 8/2007 |
| JP | 2008-045956 A | | 2/2008 |
| WO | 03/25476 A2 | | 3/2003 |
| WO | 2009/068255 A1 | | 6/2009 |
| WO | 2013/034455 A1 | | 3/2013 |
| WO | 2015/091003 A1 | | 6/2015 |
| WO | 2017/152045 A1 | | 9/2017 |
| WO | 2018/093773 A1 | | 5/2018 |
| WO | 2018/093776 A1 | | 5/2018 |
| WO | 2018/093781 A1 | | 5/2018 |
| WO | 2019/010385 A1 | | 1/2019 |
| WO | 2019/014463 A1 | | 1/2019 |
| WO | 2019/040885 A1 | | 2/2019 |
| WO | 2020/112976 A1 | | 6/2020 |

OTHER PUBLICATIONS

Overview of NAS Battery for Load Management; CEC Energy Storage Workshop, Feb. 2005, pp. 1-22.

National Research Council, "Assessment of Research Needs for Advanced Battery Systems", 1982, 203 pages.

Hodkinson et al., "Lightweight Electric/Hybrid Vehicle Design", 2001, 4 pages.

Guidotti et al., "Characterization of Vacuum-Multifoil Insulation for Long-Life Thermal Batteries", U.S. Department of Energy, Office of Scientific and Technical Information, Apr. 17, 2000, 3 pages.

Daniel et al., "Handbook of Battery Materials", Wiley-VCH Publishers, 2011, vol. 1, 3 pages.

Database WPI Week 201179 Thomson Scientific, London, GB; AN 2011-N98729 XP002794699, & CN 202 001 825 U (LINS) Oct. 5, 2011 (Oct. 5, 2011).

DeVuyst, et al: Respiratory health effects of man-made vitreous (mineral) fibres; European Respiratory Journal, 1995, 8, 2149-2173.

Muttifoil Insulation; 1 page.

U.S. Patent Application filed Apr. 23, 2010 by Concept Group Inc., U.S. Appl. No. 12/766,397.

* cited by examiner

ENHANCED VACUUM-INSULATED ARTICLES WITH CONTROLLED MICROPOROUS INSULATION

CROSS-REFERENCE TO RELATED APPLICATIONS

This application is the National Stage Application of International Patent Application No. PCT/US2017/061558 filed Nov. 14, 2017 which claims the benefit of and priority to U.S. Provisional Patent Application No. 62/422,196, "Enhanced Vacuum-Insulated Articles with Microporous Insulation" (filed Nov. 15, 2016), the entireties of which applications are incorporated herein by reference for any and all purposes.

TECHNICAL FIELD

The invention relates to structures having an insulating space that is evacuated by an applied vacuum and sealed.

BACKGROUND

It is well known that vacuum provides an excellent thermal insulator. Vacuum-sealed spaces have been incorporated in a wide variety of structures including cryogenic devices, such as medical probes, and high temperature devices, such as heat exchangers. It is also known to include gas-absorbing material, most commonly a "non-evaporable getter" material, within the vacuum-sealed space in order to achieve a sealed vacuum deeper than the vacuum of the chamber in which the insulating space is evacuated. The getter material, which may comprise metals such as zirconium, titanium, niobium, tantalum, and vanadium, as well as alloys of those metals, may be loosely contained within the vacuum space or, alternatively, coated on the inside of one or more of the surfaces defining the vacuum space.

The presence of the getter material in the vacuum space, whether loosely contained or as a coating, will limit the minimum possible width of the vacuum space. In applications where the width of the vacuum space is small, such as that encountered in many medical devices, space constraints prohibit the use of getter material in the vacuum space. The ability to form a deep vacuum in such applications without the need for getter material is therefore highly desirable.

SUMMARY

According to the invention, an article comprises first and second walls spaced at a distance to define an insulating space therebetween and a vent communicating with the insulating space to provide an exit pathway for gas molecules from the insulating space. The vent is sealable for maintaining a vacuum within the insulating space following evacuation of gas molecules through the vent. The distance between the first and second walls is variable in a portion of the insulating space adjacent the vent such that gas molecules within the insulating space are directed towards the vent during evacuation of the insulating space. The direction of the gas molecules towards the vent imparts to the gas molecules a greater probability of egress than ingress with respect to the insulating space, thereby providing a deeper vacuum without requiring a getter material in the insulating space. It should be understood that a getter may be present, but that a getter is optional.

According to one embodiment, one of the walls of the article includes a portion that converges toward the other wall adjacent the vent such that the distance between the walls is minimum adjacent the location at which the vent communicates with the insulating space. The first and second walls may be provided by first and second tubes arranged substantially concentrically to define an annular space therebetween. Alternatively, one of the walls may define a substantially rectangular insulating space for a container. It is not a requirement, however, that the walls be concentric with one another.

According to another embodiment, the vent is defined by an opening in one of the walls of the article and the other wall includes a portion opposite the vent that is arranged such that a normal line at any location within that portion is directed substantially towards the vent. The article may be a Dewar including an upper substantially cylindrical portion and a lower substantially spherical portion. The opening provided in an outer wall in the lower portion and an inner wall including an indented portion opposite the vent.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF ILLUSTRATIVE EMBODIMENTS

Figure 1:
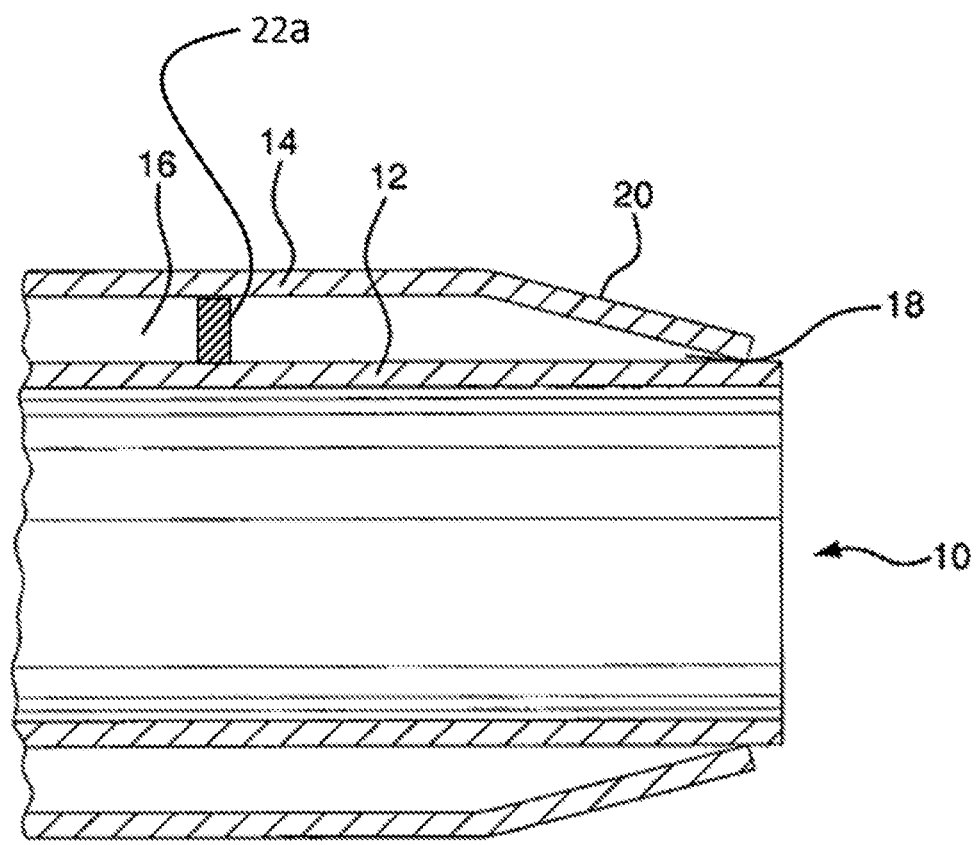
FIG. 1 is a partial sectional view of a structure incorporating an insulating space according to the invention.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Similarly, when values are expressed as approximations, by use of the antecedent "about," it will be understood that the particular value forms another embodiment.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Numerical values in the specification and claims of this application reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

The present invention increases the depth of vacuum that can be sealed within an insulation space by providing a geometry adjacent an exit having a guiding effect on gas molecules during an evacuation process. As will be described in greater detail, the geometry according to the invention provides for removal of a greater number of gas molecules from the space than could otherwise be achieved without the use of a getter material. The elimination of the need for a getter material in the evacuated space to achieve deep vacuums is a significant benefit of the present invention. By eliminating the need for getter material, the invention provides for deepened vacuums in insulated spaces in which this was not previously possible because of space constraints. Such insulated spaces include those for devices of miniature scale or devices having insulating spaces of extremely narrow width.

As explained in U.S. Pat. Nos. 7,681,299 and 7,374,063 (incorporated herein by reference in their entireties for any and all purposes), the geometry of an insulating space may be such that it guides gas molecules within the space toward a vent or other exit from the space. The width of the vacuum insulating space need not be not uniform throughout the length of the space. The space may include an angled portion such that one surface that defines the space converges toward another surface that defines the space. As a result, the distance separating the surfaces may vary adjacent the vent such the distance is at a minimum adjacent the location at which the vent communicates with the vacuum space. The interaction between gas molecules and the variable-distance portion during conditions of low molecule concentration serves to direct the gas molecules toward the vent.

The molecule-guiding geometry of the space provides for a deeper vacuum to be sealed within the space than that which is imposed on the exterior of the structure to evacuate the space. This somewhat counterintuitive result of deeper vacuum within the space is achieved because the geometry of the present invention significantly increases the probability that a gas molecule will leave the space rather than enter. In effect, the geometry of the insulating space functions like a check valve to facilitate free passage of gas molecules in one direction (via the exit pathway defined by vent) while blocking passage in the opposite direction.

Another benefit associated with the deeper vacuums provided by the geometry of insulating space is that it is achievable without the need for a getter material within the evacuated space. The ability to develop such deep vacuums without a getter material provides for deeper vacuums in devices of miniature scale and devices having insulating spaces of narrow width where space constraints would limit the use of a getter material.

Other vacuum-enhancing features may also be included, such as low-emissivity coatings on the surfaces that define the vacuum space. The reflective surfaces of such coatings, generally known in the art, tend to reflect heat-transferring rays of radiant energy. Limiting passage of the radiant energy through the coated surface enhances the insulating effect of the vacuum space.

In some embodiments, an article may comprise first and second walls spaced at a distance to define an insulating space therebetween and a vent communicating with the insulating space to provide an exit pathway for gas molecules from the insulating space. The vent is sealable for maintaining a vacuum within the insulating space following evacuation of gas molecules through the vent. The distance between the first and second walls is variable in a portion of the insulating space adjacent the vent such that gas molecules within the insulating space are directed towards the vent during evacuation of the insulating space. The direction of the gas molecules towards the vent imparts to the gas molecules a greater probability of egress than ingress with respect to the insulating space, thereby providing a deeper vacuum without requiring a getter material in the insulating space.

The construction of structures having gas molecule guiding geometry according to the present invention is not limited to any particular category of materials. Suitable materials for forming structures incorporating insulating spaces according to the present invention include, for example, metals, ceramics, metalloids, or combinations thereof.

The convergence of the space provides guidance of molecules in the following manner. When the gas molecule concentration becomes sufficiently low during evacuation of the space such that structure geometry becomes a first order effect, the converging walls of the variable distance portion of the space channel gas molecules in the space toward the vent. The geometry of the converging wall portion of the vacuum space functions like a check valve or diode because the probability that a gas molecule will leave the space, rather than enter, is greatly increased.

The effect that the molecule-guiding geometry of structure has on the relative probabilities of molecule egress versus entry may be understood by analogizing the converging-wall portion of the vacuum space to a funnel that is confronting a flow of particles. Depending on the orientation of the funnel with respect to the particle flow, the number of particles passing through the funnel would vary greatly. It is clear that a greater number of particles will pass through the funnel when the funnel is oriented such that the particle flow first contacts the converging surfaces of the funnel inlet rather than the funnel outlet.

Various examples of devices incorporating a converging wall exit geometry for an insulating space to guide gas particles from the space like a funnel are provided herein. It should be understood that the gas guiding geometry of the invention is not limited to a converging-wall funneling construction and may, instead, utilize other forms of gas molecule guiding geometries. Some exemplary vacuum-insulated spaces (and related techniques for forming and using such spaces) may be found in United States published patent applications 2017/0253416; 2017/0225276; 2017/0120362; 2017/0062774; 2017/0043938; 2016/0084425; 2015/0260332; 2015/0110548; 2014/0090737; 2012/0090817; 2011/0264084; 2008/0121642; and 2005/0211711, all by A. Reid, and all incorporated herein by reference in their entireties for any and all purposes.

Referring to the drawings, where like numerals identify like elements, there is shown in FIG. 1 an end portion of a structure 10 according to the invention having gas molecule guiding geometry. Structure 10 appears in FIG. 1 at a scale that was chosen for clearly showing the gas molecule guiding geometry of the invention. The invention, however, is not limited to the scale shown and has application to devices of any scale from miniaturized devices to devices having insulating spaces of very large dimensions. Structure 10 includes inner and outer tubes 12, 14, respectively, sized and arranged to define an annular space 16 therebetween. The tubes 12, 14 engage each other at one end to form a vent 18 communicating with the vacuum space 16 and with an exterior. The vent 18 provides an evacuation path for egress of gas molecules from space 16 when a vacuum is applied to the exterior, such as when structure 10 is placed in a vacuum chamber, for example. Exemplary vents are described elsewhere in the present disclosure and the documents cited herein.

It should be understood that in some embodiments, an inner tube may flare outwards toward the outer tube thus forming the vent between the two tubes. In such an embodiment, the inner tube can be said to be converging (or even diverging) toward the outer tube.

It should be understood that space 16 may be empty; i.e., may contain only a vacuum. In some embodiments, space 16 may optionally include an additional insulation material, e.g., a porous foam, an aerogel, or other such insulating material. An insulating material is suitably one that at least partially maintains its porous structure during processing of the article, i.e., during brazing, vacuum furnace processing, and the like. The insulating material may confer additional insulating performance onto structure 10 beyond the insulating performance conferred by a vacuum in space 16.

Microporous insulation may be, e.g., made by compacting silica or alumina particles/fibers. The particles/fibers in such insulation may have a cross-sectional dimension (diameter, length, and the like) in the range of from about 5 to about 25 nm. A microporous insulation may, by volume, comprise form about 70 to about 90% air, which air is normally contained within minute pores between particles. The pore size in a microporous insulation may be such that the majority of the pores have a size comparable to or below the mean free path of air molecules at standard atmospheric pressure, which is about 70 nm. A microporous (or other) insulation used in the disclosed technology may have a W/m*K value (measured at about 200 deg C.) of from about 0.002 to about 0.010 or even to about 0.1.

The following is a table of thermal conductivity (as a function of temperature) for one example, non-limiting microporous insulation:

TABLE 1

Thermal conductivity of exemplary microporous insulation

| Temperature | | Thermal Conductivity | |
| --- | --- | --- | --- |
| Deg. F. | Deg. C. | Btu In/Sq Ft Hr F. | W/m-K |
| 1600 | 871 | 0.4600 | 0.0066 |
| 1400 | 760 | 0.3900 | 0.0056 |
| 1200 | 649 | 0.3400 | 0.0049 |
| 1000 | 538 | 0.3000 | 0.0043 |
| 800 | 427 | 0.2600 | 0.0037 |
| 600 | 316 | 0.2300 | 0.0033 |
| 400 | 204 | 0.2200 | 0.0032 |
| 300 | 149 | 0.2100 | 0.0030 |

Without being bound to any particular theory, some insulation (including microporous insulations) may exhibit further improved performance when placed within an evacuated space A structure according to the present disclosure may optionally include a thermal pathway (which may also be termed a "thermal short") that places an inner wall (e.g., inner tube 12 in FIG. 1) into thermal communication with an outer wall (e.g., outer tube 14 in FIG. 1). The thermal pathway may be arranged such that the thermal pathway places an interior space of a device (e.g., the space enclosed by inner wall 12 in FIG. 1) into thermal communication with the exterior of the device (e.g., outer wall 14 in FIG. 1). This may be useful, e.g., in applications where a user may seek to communicate a low temperature from an area within a device (e.g., the area enclosed within inner wall 12 of FIG. 1) to a location (e.g., a defined region on outer wall 14 of FIG. 1). As but one example, a device according to FIG. 1 might include liquid nitrogen within inner wall 12, which liquid nitrogen is maintained at a temperature of about 77 K. Conductive segment 22a then gives rise to a region of low temperature on outer wall 14, while the remainder of outer wall 14 remains at essentially ambient temperature. (A marking may be placed onto outer wall 14 to identify the region of low temperature.)

A thermal pathway may be created in a number of ways. In one embodiment, the thermal pathway comprises an amount of a conducting material that bridges the walls that define an insulating space. As an example, conductive segment 22a in FIG. 1 spans space 16 and places inner wall 12 into thermal communication with outer wall 14. The conductive segment suitable comprises a metal, e.g., copper, gold, iron, and the like. Metal alloys are also suitable for use as conductive segments. One may select for use in a conductive segment a material that has variable conductive characteristics depending on temperature. As one example, a user may select copper as the material for the conductive segment in applications where the device operation will be at a comparatively low temperature, as copper's conductive characteristics are especially good at low temperatures. It should be understood that a thermal pathway is optional, and conductive segment 22a is accordingly optional and need necessarily not be present. When present, the thermal pathway suitably has a thermal conductivity less than the thermal conductivity of the insulating space between the inner and outer walls, e.g., a thermal conductivity greater than that of the vacuum, insulation, or both that may be disposed between the inner and outer walls.

As shown in FIG. 1, a thermal short may be formed by a conductive segment. A thermal short may also be formed by contacting (e.g., via pinching, bending, or other mechanical process) inner wall 12 and outer wall 14. In this way, a user may form a vacuum-insulated article as described herein and then, via application of a pinching process, form a thermal short at one or more selected locations.

A thermal pathway may also be created (again by reference to FIG. 1) by placement of a conductive segment between inner wall 12 and outer wall 14 wherein the conductive segment (not shown) is not long enough to place the inner and outer walls into thermal communication with one another. For example, the conductive segment may contact and extend from the inner wall 12 toward outer wall 14, but not also contact outer wall 14. Outer wall 14 may then be pinched or bent toward the conductive segment so as to place outer wall 14 into contact and thermal communication with the conductive segment. One or both walls may be bent or otherwise formed so as to form contact with a conductive segment.

The vent 18 is sealable in order to maintain a vacuum within the insulating space following removal of gas molecules in a vacuum-sealing process. In its presently preferred form, the space 16 of structure 10 is sealed by brazing tubes 12, 14 together. The use of brazing to seal the evacuation vent of a vacuum-sealed structure is generally known in the art. To seal the vent 18, a brazing material (not shown) is positioned between the tubes 12, 14 adjacent their ends in such a manner that, prior to the brazing process, the evacuation path defined by the vent 18 is not blocked by the material. During the evacuation process, however, sufficient heat is applied to the structure 10 to melt the brazing material such that it flows by capillary action into the evacuation path defined by vent 18. The flowing brazing material seals the vent 18 and blocks the evacuation path. A brazing process for sealing the vent 18, however, is not a requirement of the invention. Alternative methods of sealing the vent 18 could be used, such as a metallurgical or chemical processes.

The geometry of the structure 10 effects gas molecule motion in the insulating space 16 in the following manner. A major assumption of Maxwell's gas law regarding molecular kinetic behavior is that, at higher concentrations of gas molecules, the number of interactions occurring between gas molecules will be large in comparison to the number of interactions that the gas molecules have with a container for the gas molecules. Under these conditions, the motion of the gas molecules is random and, therefore, is not affected by the particular shape of the container. When the concentration of the gas molecules becomes low, however, as occurs during evacuation of an insulating space for example, molecule-to-molecule interactions no longer dominate and the above assumption of random molecule motion is no longer valid. As relevant to the invention, the geometry of the vacuum space becomes a first order system effect rather than a second order system effect when gas molecule concentration is reduced during evacuation because of the relative increase in gas molecule-to-container interactions.

The geometry of the insulating space 16 guides gas molecules within the space 16 toward the vent 18. As shown in FIG. 1, the width of the annular space 16 is not uniform throughout the length of structure 10. Instead, the outer tube 14 includes an angled portion 20 such that the outer tube converges toward the inner tube 12 adjacent an end of the tubes. As a result the radial distance separating the tubes 12, 14 varies adjacent the vent 18 such that it is at a minimum adjacent the location at which the vent 18 communicates with the space 16. As will be described in greater detail, the interaction between the gas molecules and the variable-distance portion of the tubes 12, 14 during conditions of low molecule concentration serves to direct the gas molecules toward the vent 18.

The molecule guiding geometry of space 16 provides for a deeper vacuum to be sealed within the space 16 than that which is imposed on the exterior of the structure 10 to evacuate the space. This somewhat counterintuitive result of deeper vacuum within the space 16 is achieved because the geometry of the present invention significantly increases the probability that a gas molecule will leave the space rather than enter. In effect, the geometry of the insulating space 16 functions like a check valve to facilitate free passage of gas molecules in one direction (via the exit pathway defined by vent 18) while blocking passage in the opposite direction.

An important benefit associated with the deeper vacuums provided by the geometry of insulating space 16 is that it is achievable without the need for a getter material within the evacuated space 16. The ability to develop such deep vacuums without a getter material provides for deeper vacuums in devices of miniature scale and devices having insulating spaces of narrow width where space constraints would limit the use of a getter material.

Although not required, a getter material could be used in an evacuated space having gas molecule guiding structure according to the invention. Other vacuum enhancing features could also be included, such as low-emissivity coatings on the surfaces that define the vacuum space. The reflective surfaces of such coatings, generally known in the art, tend to reflect heat-transferring rays of radiant energy. Limiting passage of the radiant energy through the coated surface enhances the insulating effect of the vacuum space.

The construction of structures having gas molecule guiding geometry according to the present invention is not limited to any particular category of materials. Suitable materials for forming structures incorporating insulating spaces according to the present invention include, for example, metals, ceramics, metalloids, or combinations thereof.

Referring again to the structure 10 shown in FIG. 1, the convergence of the outer tube 14 toward the inner tube 12 in the variable distance portion of the space 16 provides guidance of molecules in the following manner. When the gas molecule concentration becomes sufficiently low during evacuation of space 16 such that structure geometry becomes a first order effect, the converging walls of the variable distance portion of space 16 will channel gas molecules in the space 16 toward the vent 18. The geometry of the converging wall portion of the vacuum space 16 functions like a check valve or diode because the probability that a gas molecule will leave the space 16, rather than enter, is greatly increased.

The effect that the molecule guiding geometry of structure 10 has on the relative probabilities of molecule egress versus entry may be understood by analogizing the converging-wall portion of the vacuum space 16 to a funnel that is confronting a flow of particles. Depending on the orientation of the funnel with respect to the particle flow, the number of particles passing through the funnel would vary greatly. It is clear that a greater number of particles will pass through the funnel when the funnel is oriented such that the particle flow first contacts the converging surfaces of the funnel inlet rather than the funnel outlet.

Various examples of devices incorporating a converging wall exit geometry for an insulating space to guide gas particles from the space like a funnel are shown in FIGS. 2-7. However, it should be understood that the gas guiding geometry of the invention is not limited to a converging-wall funneling construction and may, instead, utilize other forms of gas molecule guiding geometries. For example, the Dewar shown in FIG. 8 and described in greater detail below, incorporates an alternate form of variable distance space geometry according to the invention.

Insulated Probes

Figure 2:
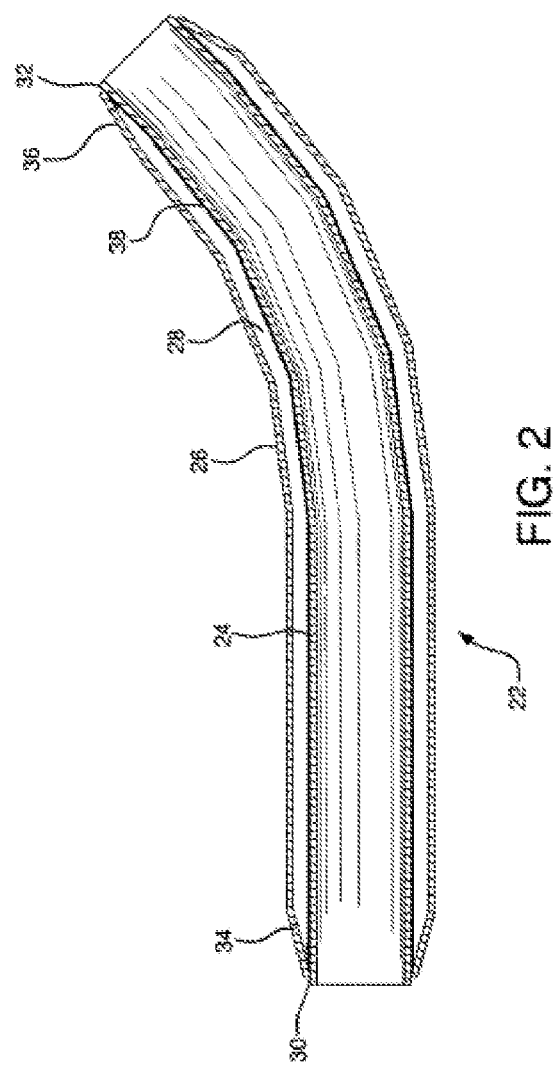
FIG. 2 is a sectional view of another structure according to the invention.

Referring to FIG. 2, there is shown a structure 22 incorporating gas molecule guiding geometry according to the invention. Similar to structure 10, structure 22 includes inner and outer tubes 24, 26 defining an annular vacuum space 28 therebetween. Structure 22 includes vents 30, 32 and angled portions 34, 36 of outer tube 26 at opposite ends that are similar in construction to vent 18 and angled portion 20 of structure 10 of FIG. 1.

The structure 22 may be useful, for example, in an insulated surgical probe. In such an application, it may be desirable that the structure 22 be bent as shown to facilitate access of an end of the probe to a particular target site. Preferably, the concentrically arranged tubes 24, 26 of structure 22 comprise a flexible material and have been bent such that the resulting angle between the central axes of the opposite ends of the structure is approximately 45 degrees. It is not a requirement that one or more walls be formed of a flexible material.

To enhance the insulating properties of the sealed vacuum layer, an optical coating 38 having low-emissivity properties may be applied to the outer surface of the inner tube 24. The reflective surface of the optical coating limits passage of heat-transferring radiation through the coated surface. The optical coating may comprise copper, a material having a desirably low emissivity when polished. Copper, however, is subject to rapid oxidation, which would detrimentally increase its emissivity. Highly polished copper, for example, can have an emissivity as low as approximately 0.02 while heavily oxidized copper may have an emissivity as high as approximately 0.78.

To facilitate application, cleaning, and protection of the oxidizing coating, the optical coating is preferably applied to the inner tube 24 using a radiatively-coupled vacuum furnace prior to the evacuation and sealing process. When applied in the elevated-temperature, low-pressure environment of such a furnace, any oxide layer that is present will be dissipated, leaving a highly cleaned, low-emissivity surface, which will be protected against subsequent oxidation within the vacuum space 28 when the evacuation path is sealed.

Figure 3:
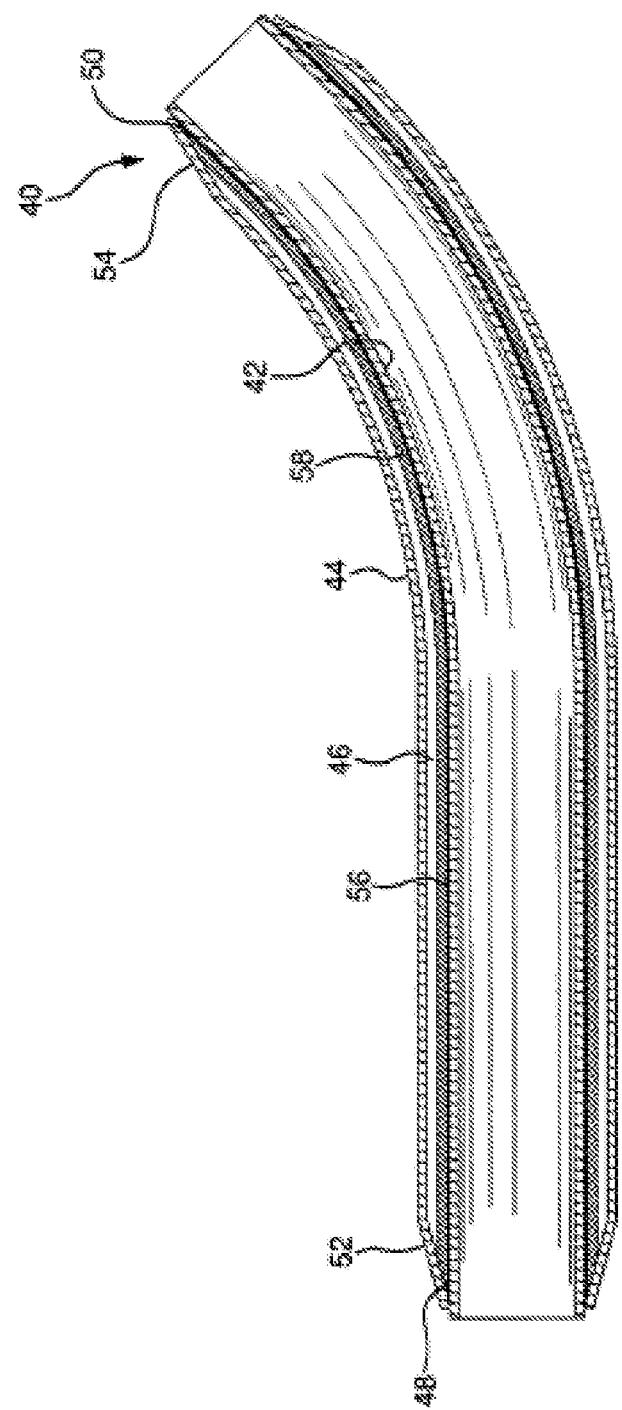
FIG. 3 is a sectional view of an alternative structure to that of FIG. 2 including a layer of spacer material on a surface of the insulation space.

Referring to FIG. 3, there is shown another structure 40 incorporating having gas molecule guiding geometry according to the invention. Similar to structure 10 of FIG. 1, structure 40 includes inner and outer tubes 42, 44 defining an annular vacuum space 46 therebetween. Structure 40 includes vents 48, 50 and angled portions 52, 54 of outer tube 44 at opposite ends similar in construction to vent 18 and angled portion 20 of structure 10 of FIG. 1. Preferably, the concentrically arranged tubes 42, 44 of structure 40 comprise a flexible material and have been bent such that the resulting angle between the central axes of the opposite ends of the structure is approximately 45 degrees. The structure 40, similar to structure 22 of FIG. 2, includes an optical coating 56 applied to the outer surface of inner tube 42.

When concentrically arranged tubes, such as those forming the vacuum spaces of the probes structures 22 and 40 of FIGS. 2 and 3, are subjected to bending loads, contact may occur between the inner and outer tubes while the loading is imposed. The tendency of concentric tubes bent in this fashion to separate from one another, or to "springback," following removal of the bending loads may be sufficient to ensure that the tubes separate from each other. In some applications, contact that does remain could provide a "thermal shorting" between the inner and outer tubes. To reduce or even eliminate such thermal shorting, structure 40 of FIG. 3 includes a layer 58 of a spacer material, which is preferably formed by winding yarn or braid comprising microfibers of ceramic or other low conductivity material. The spacer layer 58 provides a protective barrier that limits direct contact between the tubes without detrimentally limiting the flexibility of the concentrically arranged tubes 42, 44 of structure 40. As described elsewhere herein, the layer 58 may comprise an insulating material, e.g., a microporous insulating material. Also as described elsewhere herein, the disclosed devices may include one or more thermal pathways or thermal shorts.

Each of the structures of FIGS. 1 to 3 could be constructed as a stand-alone structure. Alternatively, the insulating structures of FIGS. 1 to 3 could form an integrated part of another device or system. Also, the insulating structures shown in FIGS. 1 to 3 could be sized and arranged to provide insulating tubing having diameters varying from sub-miniature dimensions to very large diameter and having varying length. In addition, as described previously, the gas molecule guiding geometry of the invention allows for the creation of deep vacuum without the need for getter material. Elimination of getter material in the space allows for vacuum insulation spaces having exceptionally small widths.

Joule-Thomson Devices

Figure 4:
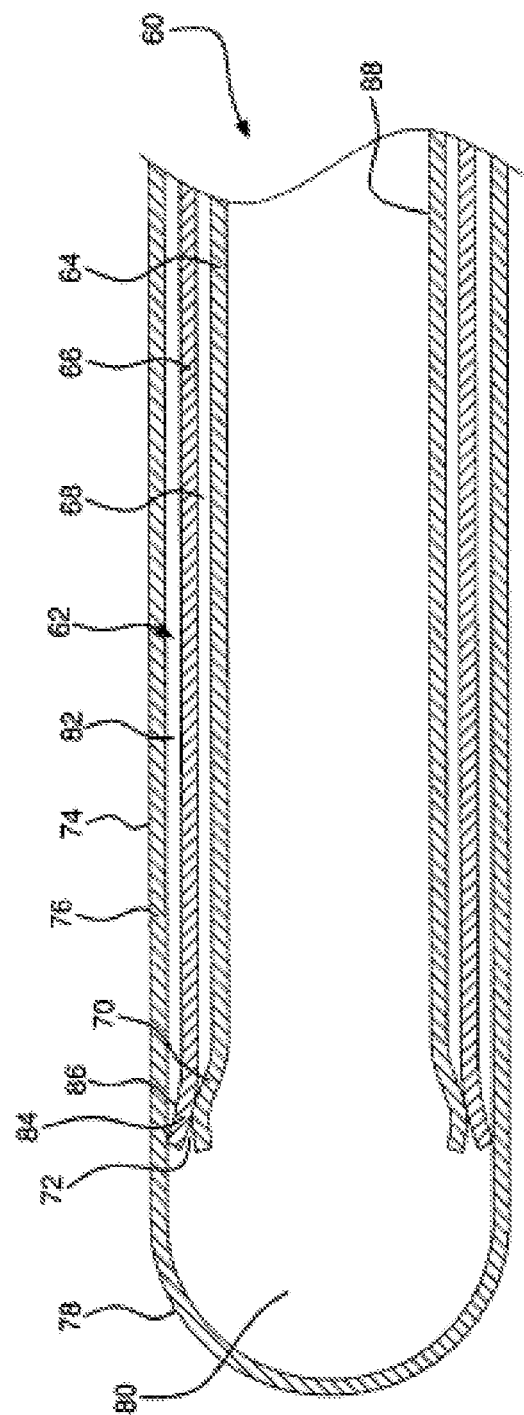
FIG. 4 is a partial sectional view of a cooling device according to the invention.

Referring to FIG. 4, there is shown a cooling device 60 incorporating gas molecule guiding geometry according to the present invention for insulating an outer region of the device 60. The device 60 is cooled utilizing the Joules-Thomson effect in which the temperature of a gas is lowered as it is expanded. First and second concentrically arranged tubes 64 and 66 define an annular gas inlet 68 therebetween. Tube 64 includes an angled portion 70 that converges toward tube 66. The converging-wall portions of the tubes 64, 66 form a flow-controlling restrictor or diffuser 72 adjacent an end of tube 64.

The cooling device 60 includes an outer jacket 74 having a cylindrical portion 76 closed at an end by a substantially hemispherical portion 78. The cylindrical portion 76 of the outer jacket 74 is concentrically arranged with tube 66 to define an annular insulating space 82 therebetween. Tube 66 includes an angled portion 84 that converges toward outer jacket 74 adjacent an evacuation path 86. The variable distance portion of the insulating space 82 differs from those of the structures shown in FIGS. 1-3 because it is the inner element, tube 64, that converges toward the outer element, the cylindrical portion 76. The functioning of the variable distance portion of insulating space 82 to guide gas molecules, however, is identical to that described above for the insulating spaces of the structures of FIGS. 1-3.

The annular inlet 68 directs gas having relatively high pressure and low velocity to the diffuser 72 where it is expanded and cooled in the expansion chamber 80. As a result, the end of the cooling device 60 is chilled. The expanded low-temperature/low-pressure is exhausted through the interior of the inner tube 64. The return of the low-temperature gas via the inner tube 64 in this manner quenches the inlet gas within the gas inlet 68. The vacuum insulating space 82, however, retards heat absorption by the quenched high-pressure side, thereby contributing to overall system efficiency.

This reduction in heat absorption may be enhanced by applying a coating of emissive radiation shielding material on the outer surface of tube 66. The invention both enhances heat transfer from the high-pressure/low-velocity region to the low-pressure/low-temperature region and also provides for size reductions not previously possible due to quench area requirements necessary for effectively cooling the high pressure gas flow.

The angled portion 70 of tube 64, which forms the diffuser 72, may be adapted to flex in response to pressure applied by the inlet gas. In this manner, the size of the opening defined by the diffuser 72 between tubes 64 and 66 may be varied in response to variation in the gas pressure within inlet 68. An inner surface 88 of tube 64 provides an exhaust port (not seen) for removal of the relatively low-pressure gas from the expansion chamber 80.

Figure 5:
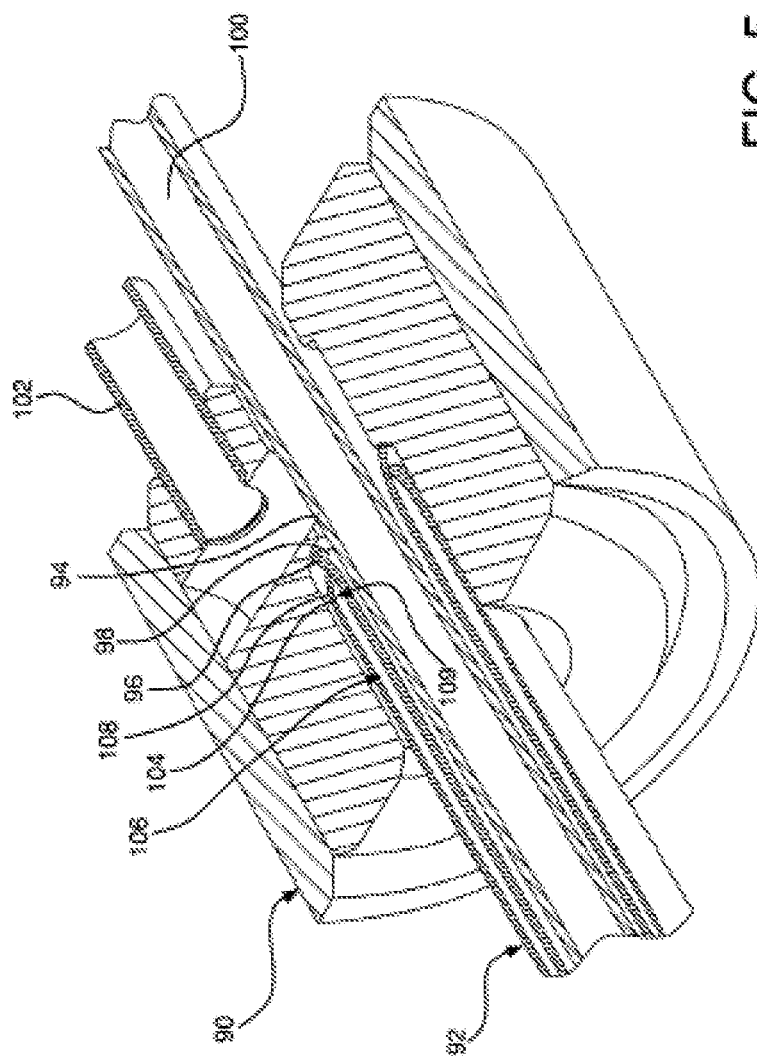
FIG. 5 is a partial perspective view, in section, of an alternative cooling device according to the invention.
Figure 6:
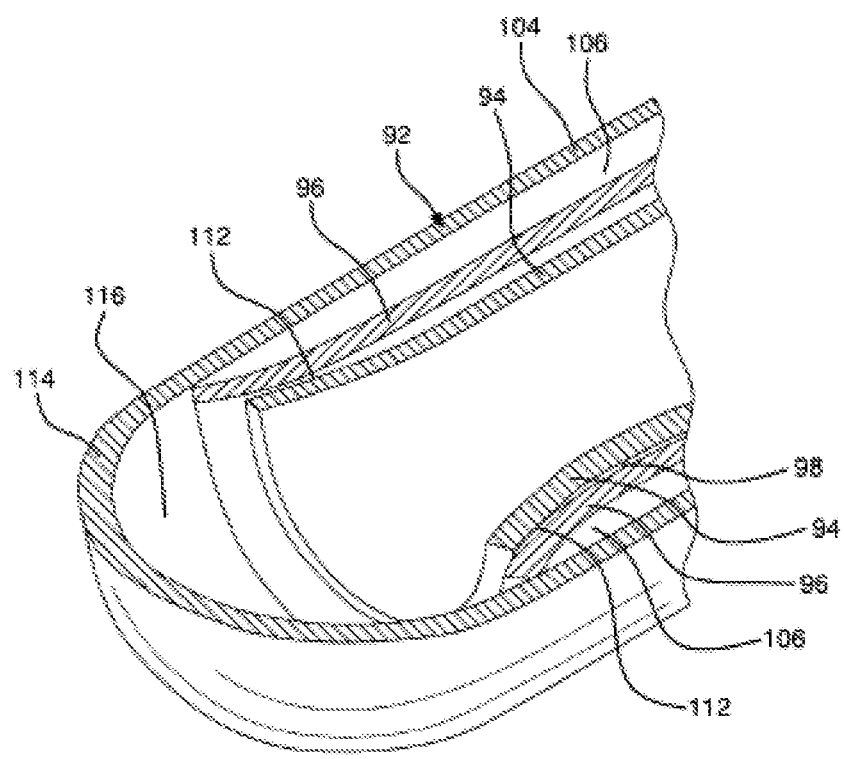
FIG. 6 is a partial perspective view, in section, of an end of the cooling device of FIG. 5 including an expansion chamber.

Referring to FIGS. 5 and 6, there is shown a cryogenic cooler 90 incorporating a Joules-Thomson cooling device 92. The cooling device 92 of the cryogenic cooler 90, similar to the device of FIG. 4, includes tubes 94 and 96 defining a high pressure gas inlet 98 therebetween and a low-pressure exhaust port 100 within the interior of tube 94. The gas supply for cooling device 90 is delivered into cooler 90 via inlet pipe 102. An outer jacket 104 forms an insulating space 106 with tube 96 for insulating an outer portion of the cooling device. The outer jacket 104 includes an angled portion 108 that converges toward the tube 96 adjacent an evacuation path 109. The converging walls adjacent the evacuation path 109 provides for evacuation and sealing of the vacuum space 106 in the manner described previously.

Referring to FIG. 6, the cooling device 92 of the cryogenic cooler 90 includes a flow controlling diffuser 112 defined between tubes 94 and 96. A substantially hemispherical end portion 114 of outer jacket 104 forms an expansion chamber 116 in which expanding gas from the gas inlet 98 chills the end of the device 92.

Figure 7:
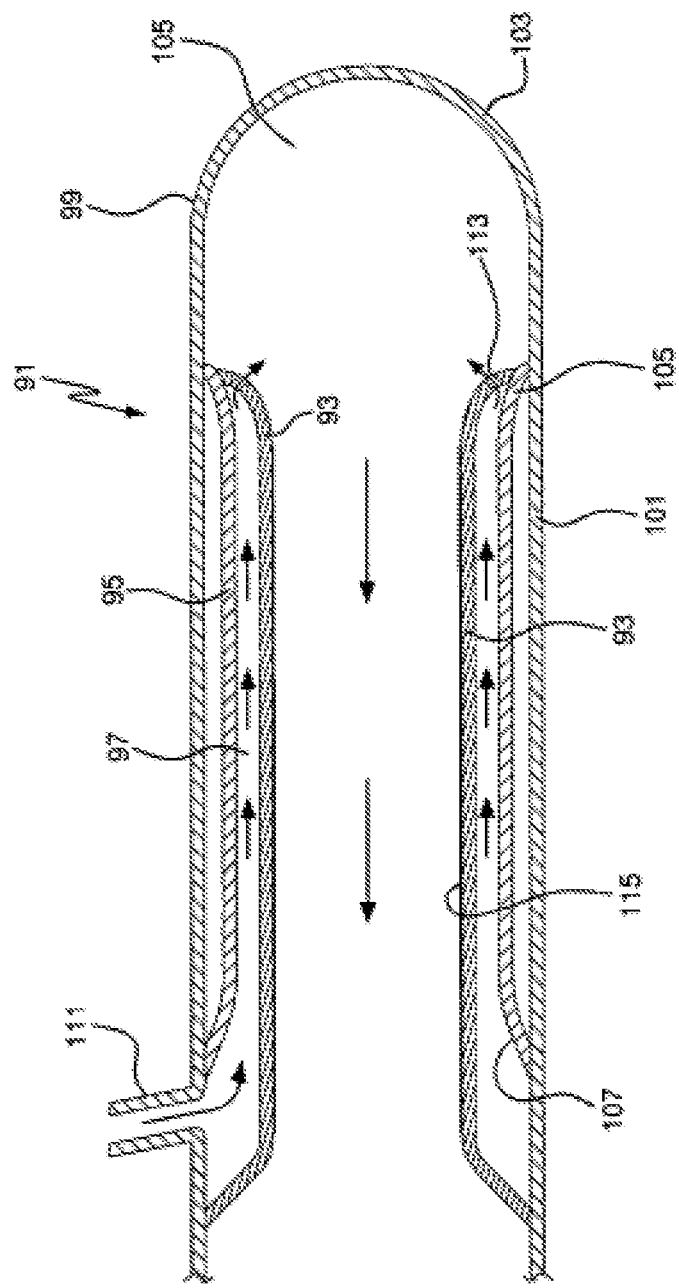
FIG. 7 is a partial sectional view of a cooling device having an alternative gas inlet construction from the cooling devices of FIGS. 4 through 6

Referring to FIG. 7, there is shown a cooling device 91 including concentrically arranged tubes 93, 95 defining an annular gas inlet 97 therebetween. An outer jacket 99 includes a substantially cylindrical portion 101 enclosing tubes 93, 95 and a substantially semi-spherical end portion 103 defining an expansion chamber 105 adjacent an end of the tubes 93, 95. As shown, tube 95 includes angled or curved end portions 105, 107 connected to an inner surface of the outer jacket 99 to form an insulating space 109 between the gas inlet 97 and the outer jacket 99. A supply tube 111 is connected to the outer jacket adjacent end portion 107 of tube 95 for introducing gas into the inlet space 97 from a source of the gas.

The construction of the gas inlet 97 of cooling device 91 adjacent the expansion chamber 105 differs from that of the cooling devices shown in FIGS. 4-6, in which an annular escape path from the gas inlet was provided for delivering gas into the expansion chamber. Instead, tube 93 of cooling device 91 is secured to tube 95 adjacent one end of the tubes 93, 95 to close the end of the gas inlet. Vent holes 113 are provided in the tube 93 adjacent the expansion chamber 105 for injection of gas into the expansion chamber 105 from the gas inlet 97. Preferably, the vent holes 113 are spaced uniformly about the circumference of tube 93. The construction of device 91 simplifies fabrication while providing for a more exact flow of gas from the gas inlet 97 into the expansion chamber 105.

A coating 115 of material having a relatively large thermal conductivity, preferably copper, is formed on at least a portion of the inner surface of tube 93 to facilitate efficient transfer of thermal energy to the tube 93.

Non-Annular Devices

Figure 8:
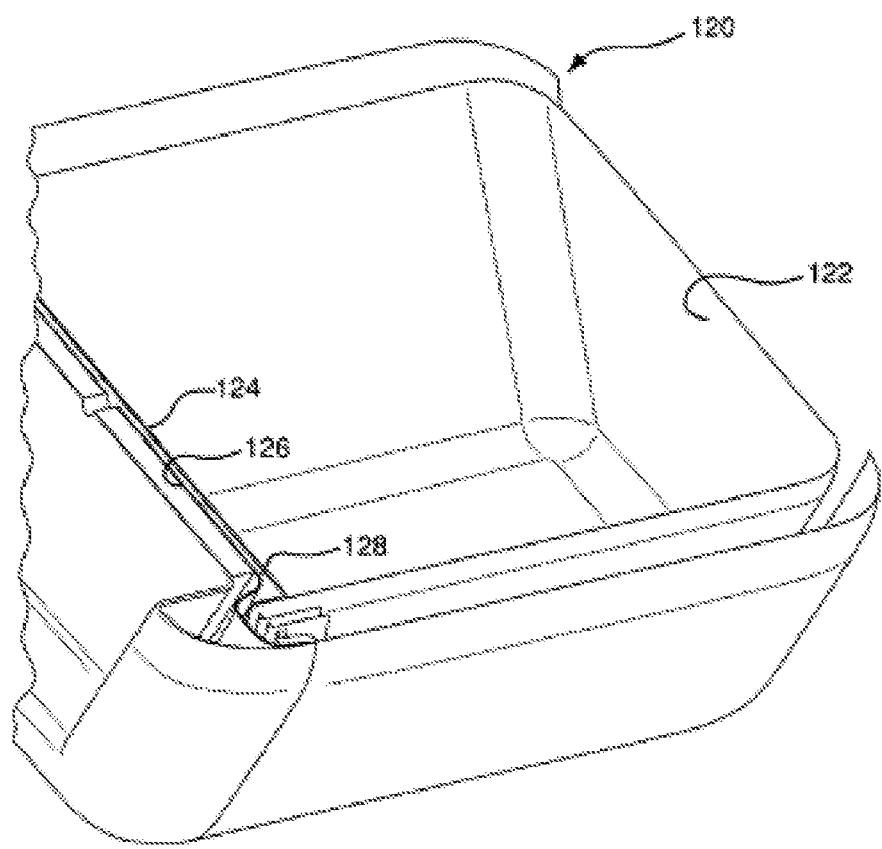
FIG. 8 is a partial perspective view, in section, of a container according to the invention.

Each of the insulating structures of FIGS. 1-7 includes an insulating vacuum space that is annular. An annular vacuum space, however, is not a requirement of the invention, which has potential application in a wide variety of structural configurations. Referring to FIG. 8, for example, there is shown a vacuum insulated storage container 120 having a substantially rectangular inner storage compartment 122. The compartment 122 includes substantially planar walls, such as wall 124 that bounds a volume to be insulated. An insulating space 128 is defined between wall 124 and a second wall 126, which is closely spaced from wall 124. Closely spaced walls (not shown) would be included adjacent the remaining walls defining compartment 122 to provide insulating spaces adjacent the container walls. The insulating spaces could be separately sealed or, alternatively, could be interconnected. In a similar fashion as the insulating structures of FIGS. 1-7, a converging wall portion of the insulating space 128 (if continuous), or converging wall portions of insulating spaces (if separately sealed), are provided to guide gas molecules toward an exit vent. In the insulated storage container 120, however, the converging wall portions of the insulated space 128 is not annular.

The vacuum insulated storage container 120 of FIG. 8 provides a container capable of indefinite regenerative/self-sustaining cooling/heating capacity with only ambient energy and convection as input energy. Thus, no moving parts are required. The storage container 120 may include emissive radiation shielding within the vacuum insulating envelope to enhance the insulating capability of the vacuum structure in the manner described previously.

The storage container 120 may also include an electrical potential storage system (battery/capacitor), and a Proportional Integrating Derivative (PID) temperature control system for driving a thermoelectric (TE) cooler or heater assembly. The TE generator section of the storage container would preferably reside in a shock and impact resistant outer sleeve containing the necessary convection ports and heat/light collecting coatings and or materials to maintain the necessary thermal gradients for the TE System. The TE cooler or heater and its control package would preferably be mounted in a removable subsection of a hinged cover for the storage container 120. An endothermic chemical reaction device (e.g., a "chemical cooker") could also be used with a high degree of success because its reaction rate would relate to temperature, and its effective life would be prolonged because heat flux across the insulation barrier would be exceptionally low.

Commercially available TE generator devices are capable of producing approximately 1 mW/in$^2$ with a device gradient of 20 deg. K and approximately 6 mW/in$^2$ with a device gradient of 40 deg. K. Non-linear efficiency curves are common for these devices. This is highly desirable for high ambient temperature cooling applications for this type of system, but may pose problems for low temperature heating applications.

High end coolers have conversion efficiencies of approximately 60%. For example a 10 inch diameter container 10 inches in height having 314 in$^2$ of surface area and a convective gradient of 20 deg. K would have a total dissipation capacity of approximately 30 mW. A system having the same mechanical design with a 40 deg. K convective gradient would have a dissipation capacity of approximately 150 mW.

Examples of potential uses for the above-described insulated container 120 include storage and transportation of live serums, transportation of donor organs, storage and transportation of temperature products, and thermal isolation of temperature sensitive electronics.

Alternate Molecule Guiding Geometry

Figure 9:
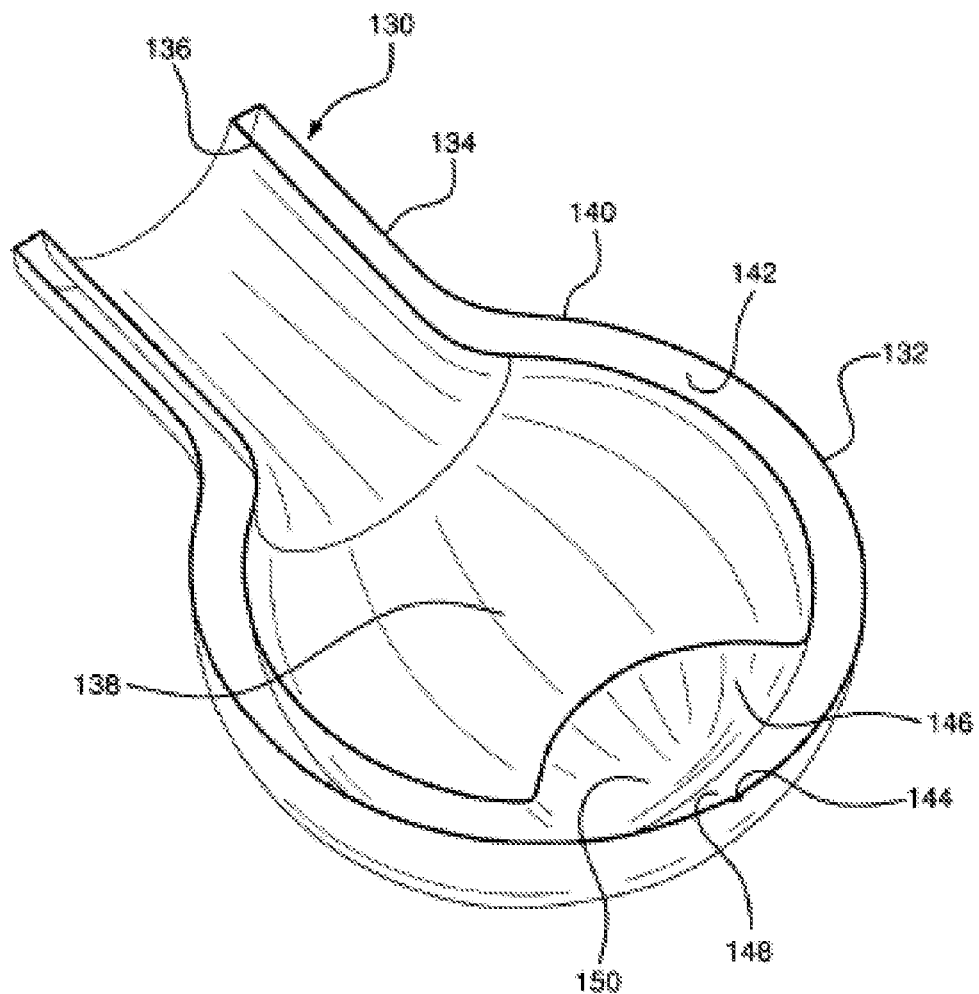
FIG. 9 is a perspective view, in section, of a Dewar according to the invention.

The present invention is not limited to the converging geometry incorporated in the insulated structure shown in FIGS. 1-8. Referring to FIG. 9, there is shown a Dewar 130 incorporating an alternate form of gas molecule guiding geometry according to the invention. The Dewar 130 includes a rounded base 132 connected to a cylindrical neck 134. The Dewar 130 includes an inner wall 136 defining an interior 138 for the Dewar. An outer wall 140 is spaced from the inner wall 136 by a distance to define an insulating space 142 therebetween that extends around the base 132 and the neck 134. A vent 144, located in the outer wall 140 of the base 132, communicates with the insulating space 142 to provide an exit pathway for gas molecules during evacuation of the space 142.

A lower portion 146 of the inner wall 136 opposite vent 144 is indented towards the interior 138, and away from the vent 144. The indented portion 146 forms a corresponding portion 148 of the insulating space 142 in which the distance between the inner and outer walls 136, 140 is variable. The indented portion 146 of inner wall 136 presents a concave curved surface 150 in the insulating space 142 opposite the vent 144. Preferably the indented portion 146 of inner wall 136 is curved such that, at any location of the indented portion a normal line to the concave curved surface 150 will be directed substantially towards the vent 144. In this fashion, the concave curved surface 150 of the inner wall 136 is focused on vent 144. The guiding of the gas molecules towards the vent 144 that is provided by the focused surface 150 is analogous to a reflector returning a focused beam of light from separate light rays directed at the reflector. In conditions of low gas molecule concentration, in which structure becomes a first order system effect, the guiding effect provided by the focused surface 150 serves to direct the gas molecules in a targeted manner toward the vent 144. The targeting of the vent 144 by the focused surface 150 of inner wall 136 in this manner increases the probability that gas molecules will leave the insulating space 142 instead of entering thereby providing deeper vacuum in the insulating space than vacuum applied to an exterior of the Dewar 130.

Figure 10:
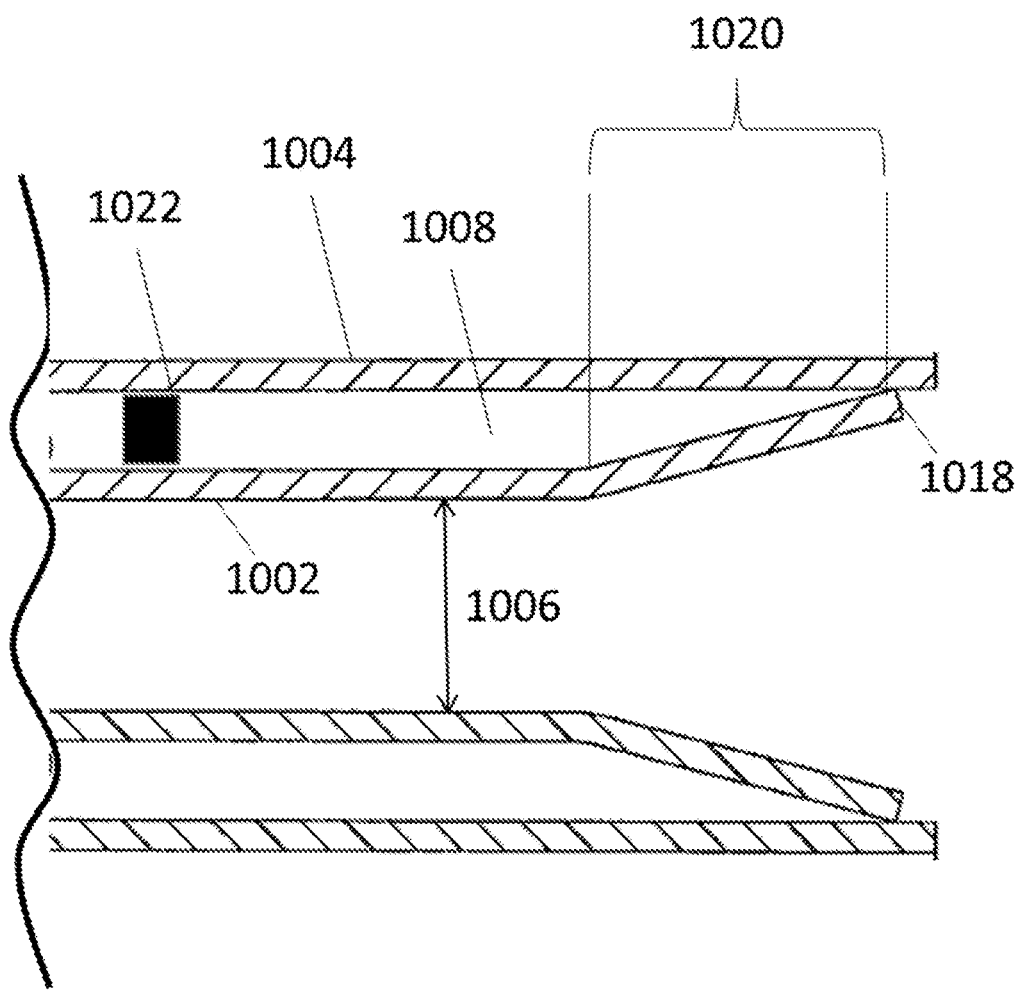
FIG. 10 provides a cutaway view of an embodiment of the disclosed technology.

FIG. 10 provides a view of an alternative embodiment. As shown in that figure, an insulated article may include inner tube 1002 and outer tube 1004, which tubes define insulating space 1008 therebetween. Inner tube 1002 also defines a lumen within, which lumen may have a cross-section (e.g., diameter) 1006. Insulating space 1008 may be sealed by sealable vent 1018. As shown in FIG. 10, inner tube 1002 may include a portion 1020 that flares outward toward outer tube 1004, so as to converge towards outer tube 1004.

Conductive segment 1022 then gives rise to a region of low temperature on the outer tube 1004, while the remainder of outer tube 1004 remains at essentially ambient temperature. (A marking may be placed onto outer wall 1004 to identify the region of low temperature.)

A thermal pathway may be created in a number of ways. In one embodiment, the thermal pathway comprises an amount of a conducting material that bridges the walls that define an insulating space. As an example, conductive segment 1022 in FIG. 10 spans space 1008 and places inner tube 1002 into thermal communication with outer tube 1004. The conductive segment suitable comprises a metal, e.g., copper, gold, iron, and the like. Metal alloys are also suitable for use as conductive segments. One may select for use in a conductive segment a material that has variable conductive characteristics depending on temperature. As one example, a user may select copper as the material for the conductive segment in applications where the device operation will be at a comparatively low temperature, as copper's conductive characteristics are especially good at low temperatures. It should be understood that a thermal pathway is optional, and conductive segment 1022 is accordingly optional and need necessarily not be present. When present, the thermal pathway suitably has a thermal conductivity less than the thermal conductivity of the insulating space between the inner and outer walls, e.g., a thermal conductivity greater than that of the vacuum, insulation, or both that may be disposed between the inner and outer walls.

As shown in FIG. 10, a thermal short may be formed by a conductive segment. A thermal short may also be formed by contacting (e.g., via pinching, bending, or other mechanical process) inner tube 1002 and outer tube 1004. In this way, a user may form a vacuum-insulated article as described herein and then, via application of a pinching process, form a thermal short at one or more selected locations.

Other Applications

The present invention has application for providing insulating layers in a wide range of thermal devices ranging from devices operating at cryogenic temperatures to high temperature devices. A non-limiting list of examples includes insulation for heat exchangers, flowing or static cryogenic materials, flowing or static warm materials, temperature-maintained materials, flowing gases, and temperature-controlled processes.

This invention allows direct cooling of specific microcircuit components on a circuit. In the medical field, the present invention has uses in cryogenic or heat-therapy surgery, and insulates healthy tissue from the effects of extreme temperatures. An insulted container, such as container 120, will allow the safe transport over long distances and extended time of temperature critical therapies and organs.

EXEMPLARY EMBODIMENTS

The following embodiments are exemplary only and do not limit the scope of the present disclosure or the attached claims.

Embodiment 1

An insulated article comprising: a first wall bounding an interior volume; a second wall spaced at a distance from the first wall to define an insulating space therebetween; a vent communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress; and an amount of an insulating material disposed within the insulating space between the first wall and the second wall.

Embodiment 2

The insulated article according to Embodiment 1, wherein one of the walls includes a portion that converges toward the other wall adjacent the vent, and wherein the distance between the walls is at a minimum adjacent the location at which the vent communicates with the insulating space.

Embodiment 3

The insulated article according to any of Embodiments 1-2, wherein the converging wall portion of the one of the walls is located adjacent an end of the associated tube.

Embodiment 4

The insulated article according to any of Embodiments 1-3, wherein the wall including the converging portion is provided by an outer one of the tubes.

Embodiment 5

The insulated article according to any of Embodiments 1-4 further comprising a coating disposed on a surface of the one of the walls, the coating formed by a material having an emissivity that is less than that of the wall on which it is disposed.

Embodiment 6

The insulated article according to any of Embodiments 1-5, wherein the amount of an insulating material comprises a porous material.

Embodiment 7

The insulated article according to any of Embodiments 1-6, wherein the amount of an insulating material has a thermal conductivity of from about 0.002 to about 0.1 W/m*K.

Embodiment 8

The insulated article according to any of Embodiments 1-7, wherein the amount of an insulating material comprises alumina, silica, or both.

Embodiment 9

The insulated article according to any of Embodiments 1-8, wherein the amount of an insulating material comprises fibers, particles, or both.

Embodiment 10

The insulated article according to any of Embodiments 1-9, wherein the amount of an insulating material comprises from about 70 to about 90% void space, by volume.

Embodiment 11

An insulated article comprising: a first wall bounding an interior volume; a second wall spaced at a distance from the first wall to define an insulating space therebetween, a vent communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress, the article further comprising an amount of an insulating material disposed in the insulating space between the first and second tubes.

Embodiment 12

The insulated article of Embodiment 11, wherein the layer comprises an amount of an insulating material disposed within the insulating space between the first wall and the second wall.

Embodiment 13

The insulated article according to any of Embodiments 11-12, wherein the amount of an insulating material comprises a porous material.

Embodiment 14

The insulated article according to any of Embodiments 11-13, wherein the amount of an insulating material has a thermal conductivity of from about 0.002 to about 0.1 W/m*K.

Embodiment 15

The insulated article according to any of Embodiments 11-14, wherein the amount of an insulating material comprises alumina, silica, or both.

Embodiment 16

The insulated article according to any of Embodiments 11-15, wherein the amount of an insulating material comprises fibers, particles, or both.

Embodiment 17

The insulated article according to any of Embodiments 11-16, wherein the amount of an insulating material comprises from about 70 to about 90% void space, by volume.

The foregoing describes the invention in terms of embodiments foreseen by the inventors for which an enabling description was available, notwithstanding that insubstantial modifications of the invention, not presently foreseen, may nonetheless represent equivalents thereto.

What is claimed is:

1. An insulated article, comprising:
   a first wall bounding an interior volume;
   a second wall spaced at a distance from the first wall to define an insulating space therebetween, the insulating space having a pressure of from about $10^{-4}$ to about $10^{-7}$ Torr;
   a vent communicating with the insulating space to provide an exit pathway for gas molecules from the space,
   the vent being sealable for maintaining a vacuum within the insulating space following evacuation of gas molecules through the vent,
   the distance between the first and second walls being variable in a portion of the insulating space adjacent the vent such that gas molecules within the insulating space are directed towards the vent by the variable-distance portion of the first and second walls during the evacuation of the insulating space,
   the directing of the gas molecules by the variable-distance portion of the first and second walls imparting to the gas molecules a greater probability of egress from the insulating space than ingress; and
   an amount of an insulating material disposed within the insulating space between the first wall and the second wall,
   the insulating material comprising particles, fibers, or both, the particles, fibers, or both defining a cross-sectional dimension in the range of from about 5 nm to about 25 nm.

2. The insulated article according to claim 1, wherein one of the walls includes a portion that converges toward the other wall adjacent the vent, and wherein the distance between the walls is at a minimum adjacent the location at which the vent communicates with the insulating space.

3. The insulated article according to claim 2, wherein the converging wall portion of the one of the walls is located adjacent an end of the associated wall.

4. The insulated article according to claim 1, wherein the first wall is characterized as a tube, wherein the second wall is characterized as a tube, and wherein one of the first tube and the second tube is outer to the other and wherein the wall including the converging portion is provided by the outer of the tubes.

5. The insulated article according to claim 1, further comprising a coating disposed on a surface of the one of the walls, the coating formed by a material having an emissivity that is less than that of the wall on which it is disposed.

6. The insulated article according to claim 1, wherein the insulating material defines a plurality of pores therein, the majority of which pores have a size of about 70 nm or smaller.

7. The insulated article according to claim 1, wherein the amount of an insulating material has a thermal conductivity of from about 0.002 to about 0.01 W/m*K.

8. The insulated article according to claim 1, wherein the amount of an insulating material comprises alumina, silica, or both.

9. The insulated article according to claim 1, wherein the amount of an insulating material comprises from about 70 to about 90% void space, by volume.

10. An insulated article comprising:
    a first tube bounding an interior volume;
    a second tube spaced at a distance from the first wall to define an insulating space therebetween, the insulating space having a pressure of from about $10^{-4}$ to about $10^{-7}$ Torr;
    a vent communicating with the insulating space to provide an exit pathway for gas molecules from the space,
    the vent being sealable for maintaining a vacuum within the insulating space following evacuation of gas molecules through the vent,
    the distance between the first and second tubes being variable in a portion of the insulating space adjacent the vent such that gas molecules within the insulating space are directed towards the vent by the variable-distance portion of the first and second tubes during the evacuation of the insulating space,
    the directing of the gas molecules by the variable-distance portion of the first and second walls imparting to the gas molecules a greater probability of egress from the insulating space than ingress,
    the article further comprising an amount of an insulating material disposed in the insulating space between the first and second tubes,
    the insulating material comprising particles, fibers, or both, the particles, fibers, or both defining a cross-sectional dimension in the range of from about 5 nm to about 25 nm.

11. The insulated article according to claim 10, wherein the amount of an insulating material comprises a porous material.

12. The insulated article according to claim 10, wherein the amount of an insulating material has a thermal conductivity of from about 0.002 to about 0.1 W/m*K.

13. The insulated article according to claim 10, wherein the amount of an insulating material comprises alumina, silica, or both.

14. The insulated article according to claim 10, wherein the amount of an insulating material comprises from about 70 to about 90% void space, by volume.

15. The insulated article according to claim 10, wherein the insulating material defines a plurality of pores therein, the majority of which pores have a size of about 70 nm or smaller.

* * * * *